US009472026B2

(12) United States Patent
Gerez et al.

(10) Patent No.: US 9,472,026 B2
(45) Date of Patent: Oct. 18, 2016

(54) AVIONICS METHOD AND DEVICE FOR MONITORING A TURBOMACHINE AT STARTUP

(71) Applicant: SNECMA, Paris (FR)

(72) Inventors: Valerio Gerez, Yerres (FR); Serge Christian Joel Blanchard, Melun (FR); Julien Alexis Louis Ricordeau, Paris (FR)

(73) Assignee: SNECMA, Paris (FR)

( * ) Notice: Subject to any disclaimer, the term of this patent is extended or adjusted under 35 U.S.C. 154(b) by 95 days.

(21) Appl. No.: 14/183,820

(22) Filed: Feb. 19, 2014

(65) Prior Publication Data

US 2014/0236451 A1 Aug. 21, 2014

(30) Foreign Application Priority Data

Feb. 20, 2013 (FR) ..................................... 13 51421

(51) Int. Cl.

| | |
|---|---|
| ***G06F 19/00*** | (2011.01) |
| ***G07C 5/00*** | (2006.01) |
| ***F01D 19/02*** | (2006.01) |
| ***F01D 21/06*** | (2006.01) |
| ***F01D 25/04*** | (2006.01) |

(52) U.S. Cl.

CPC ................ *G07C 5/00* (2013.01); *F01D 19/02* (2013.01); *F01D 21/06* (2013.01); *F01D 25/04* (2013.01); *F05D 2260/80* (2013.01); *F05D 2260/81* (2013.01); *F05D 2270/04* (2013.01); *F05D 2270/709* (2013.01)

(58) Field of Classification Search

CPC ........ F01D 11/14; F01D 21/04; F01D 11/20; F01D 11/24; F01D 21/003; F01D 11/08

See application file for complete search history.

(56) References Cited

U.S. PATENT DOCUMENTS 6,409,471 B1 * 6/2002 Stow .......................... 415/173.1
7,742,881 B2 6/2010 Muralidharan et al.
8,850,876 B2 * 10/2014 Ertz et al. ................. 73/114.55

(Continued)

FOREIGN PATENT DOCUMENTS

EP 1 607 583 A1 12/2005
EP 1 717 419 A1 11/2006

(Continued)

OTHER PUBLICATIONS

French Preliminary Search Report issued Nov. 8, 2013 in French Application 13 51421, filed on Feb. 20, 2013 (with English Translation of Categories of Cited Documents).

*Primary Examiner* — Redhwan K Mawari

(74) *Attorney, Agent, or Firm* — Oblon, McClelland, Maier & Neustadt, L.L.P.

(57) ABSTRACT

A method of characterizing a turbine engine, the method comprising:

steps of using measurements from an accelerometer monitoring a particular turbine engine while it is starting to detect the energy released by any contact during said starting between the rotor and the stator of the turbine engine, and of associating any such detection of contact with thermodynamic data measured on the particular turbine engine; and then a recognition training step, based on the associations, to enable a thermal context of the turbine engine to be used to recognize the presence of a rotor thermal unbalance to be taken into account in order to avoid contacts between the rotor and the stator on starting.

16 Claims, 2 Drawing Sheets

(56) References Cited

U.S. PATENT DOCUMENTS

| | | | | |
|---|---|---|---|---|
| 2001/0001845 | A1* | 5/2001 | Khalid et al. | 701/100 |
| 2005/0225456 | A1 | 10/2005 | Greene | |
| 2005/0271499 | A1 | 12/2005 | Loy et al. | |
| 2006/0245910 | A1 | 11/2006 | Buchal et al. | |
| 2009/0037035 | A1* | 2/2009 | Hershey et al. | 701/3 |
| 2009/0037121 | A1 | 2/2009 | Muralidharan et al. | |
| 2010/0100248 | A1* | 4/2010 | Minto et al. | 700/287 |
| 2010/0169030 | A1* | 7/2010 | Parlos | 702/58 |
| 2012/0316748 | A1 | 12/2012 | Jegu et al. | |

FOREIGN PATENT DOCUMENTS

| | | | |
|---|---|---|---|
| EP | 2 532 840 | A1 | 12/2012 |
| WO | WO 2013/007912 | A1 | 1/2013 |

* cited by examiner

AVIONICS METHOD AND DEVICE FOR MONITORING A TURBOMACHINE AT STARTUP

TECHNICAL FIELD AND PRIOR ART

The invention lies in the field of monitoring aircraft turbine engines, in particular turbojets.

Turbine engines comprise at least one rotor and at least one stator. It is known that thermal unbalance is likely to appear on the rotor shortly after the engine has been stopped. The natural ventilation of the engine while it is in operation, is then no longer present, and as a result heat naturally migrates towards the high portions of the engine. This gives rise to an asymmetrical distribution of heat and leads to significant bending of the rotor, which sags between the bearings that support it. The rotor thus presents unbalance, which is referred to as “thermal” unbalance. This unbalance disappears progressively providing the engine remains stopped for long enough to cool down.

If the engine is started while thermal unbalance is present, centrifugal force will tend to increase the bending of the rotor and thereby increase the unbalance, thus producing a phenomenon that is self-amplifying, with the shape of the rotor departing further and further from its functional shape. The ventilation that appears in the following instants serves to reduce the temperature of the rotor and to return the rotor towards its functional shape, but transient contacts between the rotor and the stator are nevertheless likely to occur, thereby damaging the engine and deteriorating its performance, assuming that it is not made completely unusable. In particular, contacts between the tips of the rotating blades and the abradable coating of the stator cause clearance between them to be increased, thereby leading to a deterioration in the performance of the engine.

One known practice for overcoming the danger to the engine that is constituted by the thermal unbalance after the engine has been stopped is merely to inform the pilot, by specifying in the manual of the aircraft that there is a time period determined from the instant at which the engine was stopped during which restarting is not recommended. This fixed period, as determined by the manufacturer of a given engine, begins a short while after stopping, since it is found that immediately after stopping the unbalance has not yet formed. Thereafter the period extends for an elapsed length of time that is long enough for the unbalance to fade sufficiently for the risk of contact between rotor and stator to be considered as being sufficiently small or for any contact not to be penalizing for the turbine engine.

That practice suffers from the drawback of not taking into account the particular state of the engine(s) at the moment it is desired to restart it/them, and of not taking account of the procedure used for stopping the engine(s).

It is believed that this particular state is influenced specifically by the particular conditions of the operating and stopping sequence preceding the restarting desired by the pilot, and by the particular characteristics of the engine in question, since each engine has its own departures from an average model for engines of the same type, which departures may already be present on fabrication or may appear during the lifetime of the particular engine.

An object of the invention is to solve the problem mentioned above.

DEFINITION OF THE INVENTION AND ASSOCIATED ADVANTAGES

To solve this problem, the invention proposes an avionics device for monitoring an aircraft turbine engine including means for recognizing at least one condition for the presence of a thermal unbalance on a rotor of the turbine engine after it has stopped in order to inform the pilot as well as possible prior to any restarting process and/or, in a second embodiment, in order to control the restarting process.

By means of this device, it is possible to protect the turbine engine and to improve the probability of no contact occurring between rotor and stator, so that the turbine engine is not damaged because of the presence of a thermal unbalance.

In one embodiment, the device has means for estimating a future time period after the turbine engine has been stopped during which a thermal unbalance is to be expected.

In certain variants, the pilot is provided with assistance in deciding whether to start.

According to various embodiment characteristics, the thermal unbalance is estimated by making use of at least: a measured temperature; and/or a measured pressure; and/or a measured acceleration.

Advantageously, thermal unbalance is estimated by using a statistical model, e.g. comprising a decision tree, a neural network, or any other appropriate probabilistic model or statistical model.

In an advantageous embodiment, a database is established that contains, for a given start, at least one observed or estimated unbalance value, an instant of contact between the rotor and the stator, if any, or a thermal context of the turbine engine. In this embodiment, a method is performed that comprises a training stage followed by a monitoring stage. The training is advantageously, but not necessarily, performed at the scale of a fleet of airplanes.

Proposals are also made to transmit information to a database on the ground concerning an unbalance that has been observed or estimated on the basis of data provided by at least one accelerometer, which accelerometer data is associated with data about contacts, if any, that have occurred between the rotor and the stator. This makes it possible to perform a training process in a system comprising an entity on the ground and avionics devices on board a fleet of aircraft.

In a particular embodiment, during a calculation for monitoring a process of restarting the turbine engine, the clearance is estimated between the tips of the rotor blades and the coating of the stator.

The invention also provides a method of characterizing a turbine engine, the method comprising:

- steps of using measurements from an accelerometer monitoring a particular turbine engine while it is starting to detect the energy released by any contact during said starting between the rotor and the stator of the turbine engine, if any, during said starting, and of associating any such detection of contact with thermodynamic data measured on the particular turbine engine at the time of said starting; and then
- a recognition training step, based on the associations, to enable a thermal context of the turbine engine to be used to recognize the presence of a rotor thermal unbalance to be taken into account in order to avoid contacts between the rotor and the stator on starting.

The method may also comprise steps of using measurements from an accelerometer monitoring the turbine engine to determine a thermal unbalance value, which value is subsequently associated with the thermodynamic data for the training step.

The method may also comprise steps of inspecting the turbine engine when stopped to determine information about contact, if any, during said starting, which information is then associated with the thermodynamic data for the training step.

The method may also comprise making use of simulated data concerning the behavior of the turbine engine for the training step.

The method may be carried out for a particular given turbine engine or for a fleet of turbine engines of the same model.

It is specified that the thermodynamic data comprises temperatures, pressures, or temperature gradients.

In various implementations, detecting the energy released by a contact, if any, alternatively comprises calculating a root means square of the measurements of an accelerometer, or performing a Fourier transform on the measurements on an accelerometer.

Finally, a computer program is also proposed comprising instructions that, when performed by a computer of the on-board avionics system, proceed with executing steps of a method as mentioned above.

DETAILED DESCRIPTION OF AN IMPLEMENTATION

Figure 1:
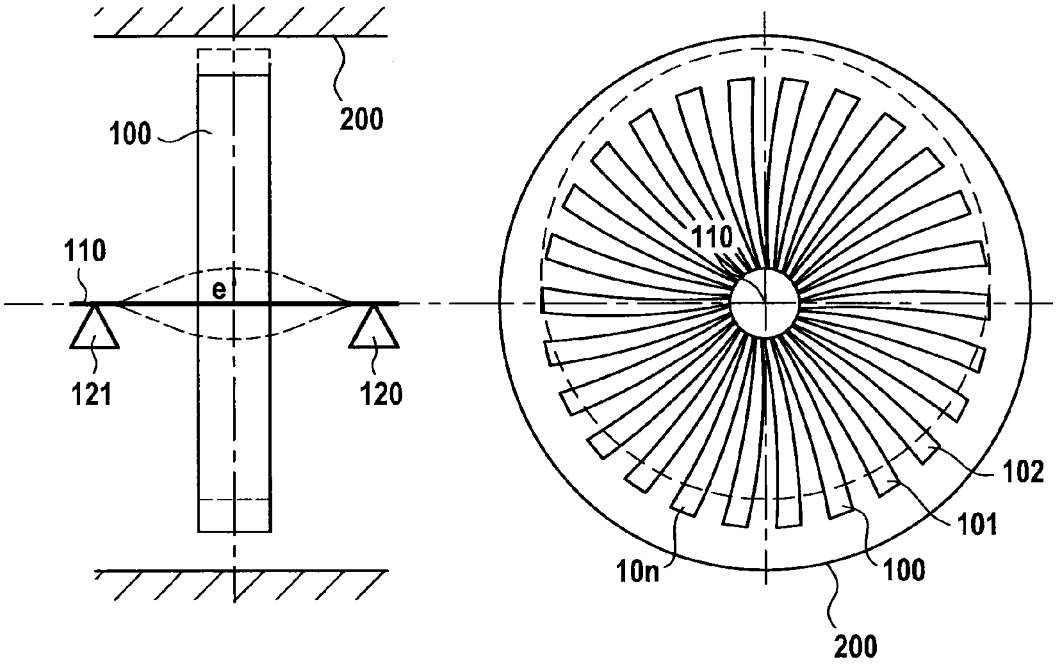
FIG. 1 shows a turbine engine in side view and in front view, together with the deformation associated with thermal unbalance.

FIG. 1 shows the rotor 100 and the stator 200 of a turbojet. The example described relates to the high pressure (HP) spool of the turbine engine. The view on the left-hand side is a side view, while the view on the right-hand side is a front view. The rotor carries a series of blades 101, 102, . . . , **10*n* that are fastened to the shaft 110 of the rotor (high pressure shaft). This shaft is held by bearings 120 and 121 that enable it to be rotated relative to the stator 200**. The surface of the stator facing the rotor may be covered in an abradable coating.

In the presence of unbalance, the shaft 110 is deformed, and the rotor is offset with eccentricity written e. The position of the rotor as drawn in continuous lines is for the absence of unbalance, and in dashed lines for the presence of unbalance. It can be seen that in the presence of unbalance, the risks of contact between the blades 101, . . . , **10*n*** and the stator are greatly increased.

Figure 2:
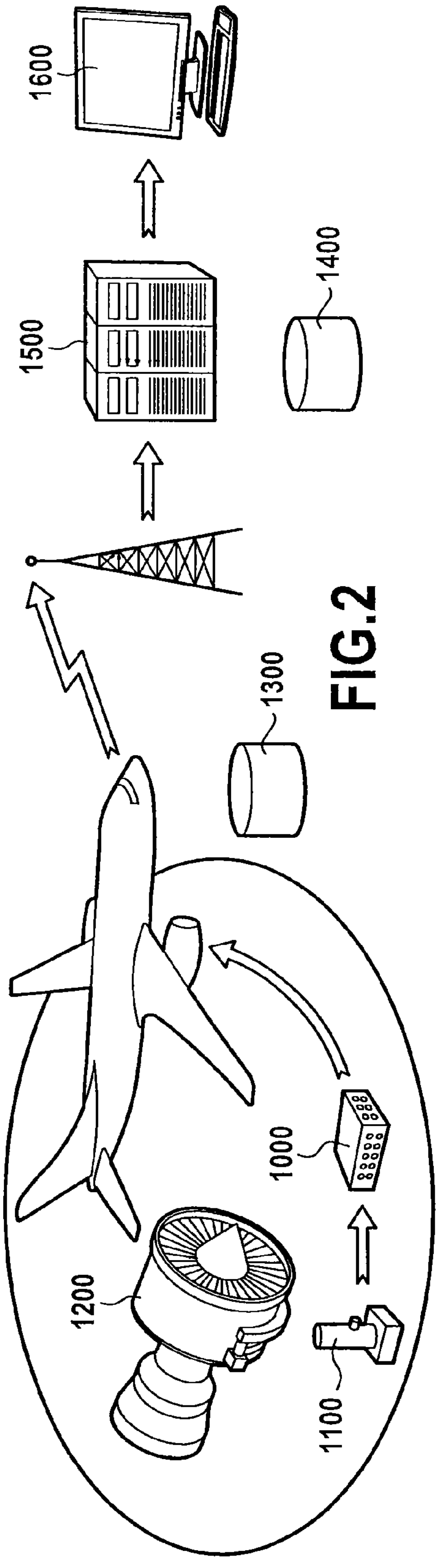
FIG. 2 shows the training process performed in an implementation of the invention.

FIG. 2 shows a method of monitoring a turbine engine, specifically a turbojet, in an implementation of the invention, by performing both a training stage that is performed at the scale of a fleet of airplanes and/or at the scale of a particular given engine in service, and also a monitoring/warning stage for a given engine. In this implementation and by way of example, the monitoring method is performed by the full authority digital engine control (FADEC) 1000 that receives information from sensors 1100 measuring physical magnitudes characterizing the state of a turbojet 1200 and that stores them, e.g. as a function of a time scale.

Figure 3:
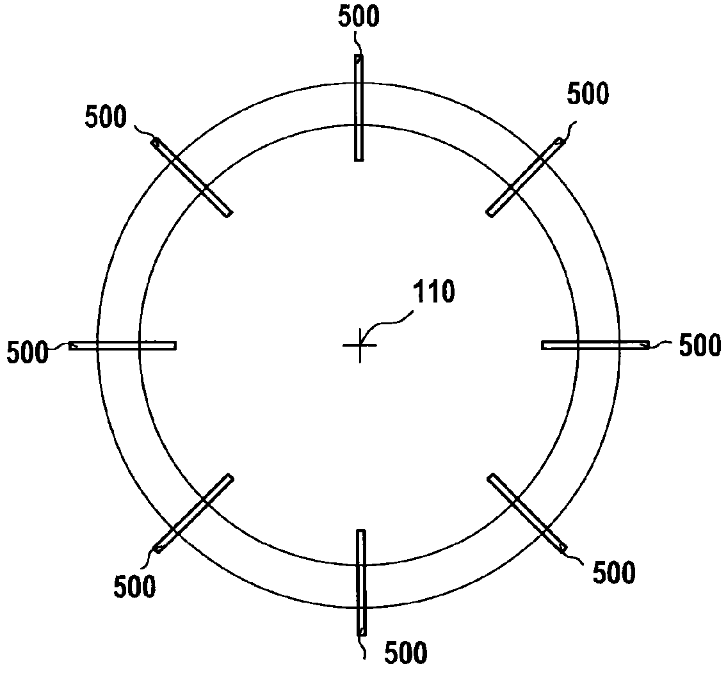
FIG. 3 shows an aspect of performing the invention.

The information measured by the sensors 1100 includes temperatures, such as the temperatures Tamb, T3, and EGT (FADEC-specific notation), and also pressures such as Pamb (FADEC-specific notation). Attention is given more particularly to the values of the exhaust gas temperature (EGT) as measured around the low pressure turbine of the turbojet 1200 at various positions for the purpose of taking account of the temperature gradient as a function of angular position around the turbojet (this can be seen in FIG. 3, where the sensors 500 are arranged all around the axis 110, so that EGT is measured over 360°). In certain variants, account is also taken of the oil temperature of the engine.

These values are measured during starting stages, and during stages when the engine is stopped, and also during periods in which the engine is stopped while it is waiting to start again, at least so long as the FADEC is in service.

The information measured by the sensors 1100 includes signals measured by accelerometers of the turbojet 1200. Specifically, these accelerometers may be the accelerometers that are present on all aircraft turbine engines, in particular to inform the pilot about the level of vibration while in flight. By way of example there may be two of these sensors.

The data from the accelerometers also makes it possible to extract, i.e. to distinguish between both a vibratory level produced by unbalance, and also spot vibration due to contacts between rotor and stator, whenever these occur.

The unbalance on starting is calculated by the FADEC 1000 on the basis of a reference stage and on the basis of the accelerometer signals (defining a vibratory level due to the unbalance on starting), by performing an unbalance detection algorithm. The unbalance on starting is made up of a thermal unbalance plus the mechanical unbalance that exists when cold. The mechanical unbalance may be determined in advance by being measured while the jet is stopped. In practice, the starting unbalance is close to the thermal unbalance, since the mechanical unbalance is small.

The data from the accelerometers is also subjected to root mean square (RMS) analysis on the fly in order to detect the energy released by the impacts and by the intense friction generated by radial contact between rotor and stator. The data may be analyzed by calculating an overall RMS level which is compared with a predetermined threshold value beyond which it is considered that an impact has taken place. It is also possible to look for a sudden rise in the overall RMS level in the accelerometer signals.

Another method consists in resolving the accelerometer signals into a Fourier series and in reproducing them as Campbell diagrams in order to show up the energy released by the impacts and by the intense friction generated by radial contacts between stator and rotor. Resolving as a Fourier series serves to show up characteristic lines at certain frequencies, and also the appearance of new frequencies in the accelerometer signals that are representative of the appearance of a thermal unbalance, and indeed the appearance of lines that are characteristic of energy being released at the same given instant over all of the frequencies in the bandwidth. Conversion into a Campbell diagram serves to correlate the characteristic lines representative of an energy level as a function of engine speed, for example.

For this analysis of the accelerometer data, the vibration level associated with the mechanical unbalance that exists when cold is initially subtracted from the overall RMS level.

An on-board maintenance system (not shown) fills up a database 1300 for the airplane using the determined thermal unbalance values, which are associated with temperature and pressure information, and the occurrences of contacts between rotor and stator, and specifically the times of such occurrences. These are determined by analyzing the accelerometer signals as described above, and optionally also by the opinion of the pilots who are required to input their experience in flight and who can thus specify whether they are of the opinion that contact has occurred between rotor and stator. Also optionally, endoscopic inspection of the engine makes it possible to determine whether contact has occurred and to add information to the database 1300. Endoscopic inspections serve to determine the level of penetration of the blades into the abradable coating, for each stage of the turbine engine, and on each azimuth angle.

The database 1300 is used to establish a database 1400 on the ground that relates to a fleet of airplanes. The data is sent in the form of reports, e.g. as aircraft communication addressing and reporting system (ACARS) messages sent to ground infrastructure 1500, for example. This provides statistical information about the conditions under which contacts occur between rotor and stator in the jets of the airplanes in the fleet.

The data in the database 1400 is used to generate a statistical model for estimating when the probability of there being thermal unbalance exceeds a certain threshold, with a numerical value being determined as a function of conditions. The model can also provide a numerical value for the minimum clearance that remains between the tips of the blades of the rotor and the inside surface of the stator, as a function of conditions. This database 1400 on the ground and the predictive model are then used to update a function of preventing contacts between rotor and stator in each airplane. In one variant, it is a model in the form of a decision or regression tree that is used, whereas in another variant it is a neural network (with a back propagation algorithm then being performed to train the network), or indeed in another variant the model is a Bayesian network. Physical models may also be recalibrated in order to refine estimation of the above-mentioned values. The model is modified regularly whenever new information is provided by an airplane of the fleet. Improvements are provided by a support team 1600, should that be necessary.

Once the model has been installed in a given aircraft fitted with one or more particular given engines, the model may be consolidated and enriched with data acquired during flights of the aircraft in question, so as to personalize the model for the particular engine(s) in question.

Figure 4:
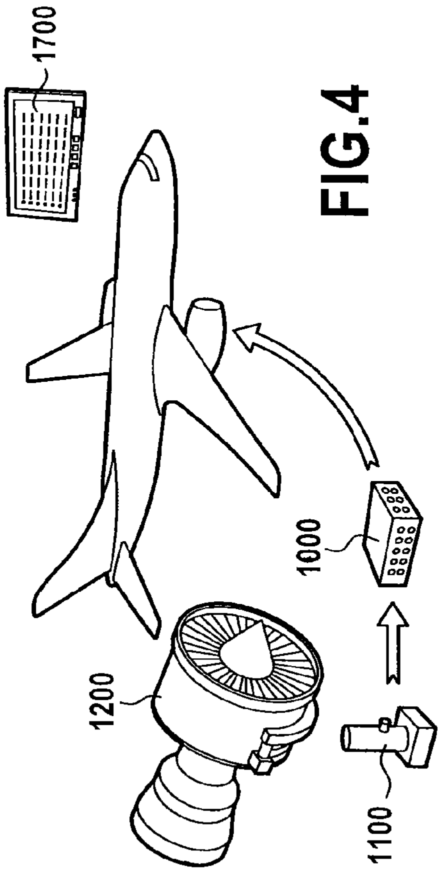
FIG. 4 shows the process of performing the invention in order to restart the engine after it has been stopped.

FIG. 4 shows the detail of the operation of the device for preventing contacts between rotor and stator while monitoring thermal unbalance conditions for a given aircraft, the device being fed with data obtained during a training stage.

In the FADEC 1000, the algorithms of the model obtained by experience from the training stage are implemented by a computer to estimate the instantaneous clearance between the rotor and the stator, and on that basis to determine whether an imminent start will be subject to thermal unbalance conditions. It is also possible to determine time intervals during which starting is recommended: $[t0,t1]\cup[t2,+\infty[$; it being understood that starting is not recommended between t1 and t2. It generates a report for the attention of the pilot.

The model is performed by using information from the sensors 1100, as enumerated above, and in particular thermodynamic information. The model also makes use of the time that has elapsed since the most recent start, and/or the time that has elapsed since the most recent stop, together with the unbalance level measured with the help of the accelerometer data during the most recent stop.

Once the engine has stopped, the model is interrogated periodically and it specifies whether the conditions are met for starting without thermal unbalance. Before starting, the model also provides an estimate of the values of t1 and t2, as defined above. This information is transmitted to an on-board system in communication with the cockpit.

In an implementation, the method provides information, but leaves it up to the pilot to decide whether or not to restart the engine. The information is transmitted via a man/machine interface to the pilot, and in particular it may be displayed on the multipurpose control display unit (MCDU) 1700, and it may take one of the following forms:

"high probability of thermal unbalance: starting not recommended";

"low probability of thermal unbalance: starting under normal balance conditions"; or "next period for starting without risk of rotor/stator contact: . . . ".

It can thus take the form of a warning if the conditions for thermal unbalance apply, or it can provide the cockpit with information about the recommended time for the next start.

In a second implementation, possibly combinable with the first, the invention may also comprise a system for preventing any restarting or for restricting the ability of the pilot to order restating in the event of thermal unbalance.

In a third implementation, possibly combinable with the first two, after the engine has stopped, the monitoring device provides a probability of contact in the event of starting as a function of time, and/or an evaluation of the severity of the contact to be expected in the event of starting, but on a discrete scale, e.g. having three levels (e.g.: 1=rotor blocked; 2=major penetration without blocking; 3=superficial contact only).

In all of the implementations of the monitoring method, the risk of contact may be estimated at any instant for possible restarting at that instant, as an alternative to or in combination with possible restarting intended at a future time that may be selected.

In summary, in the implementation described, the invention comprises both a training stage performed each time an engine is started so as to build up one or more databases and develop an algorithm for providing decision-making assistance before starting, and also a monitoring stage that is performed in parallel while each aircraft is in use, once it has been possible to develop a predictive model on the basis of the available data. The predictive model is updated regularly and enriched with new data from the training process. Training and monitoring take place together and continuously. Thus, the representation of FIG. 4 is merely a subset of the representation of FIG. 2.

Instead of being fed with data from a training stage carried out at the scale of a fleet, the monitoring device may also be fed with data obtained by modeling and computer simulations, making it possible in the same way to determine the presence of one or more conditions for thermal unbalance being present.

The invention is not limited to the implementations described, but extends to variants within the ambit of the claims. It applies not only to turbojets, but also to turboprops.

The invention claimed is:

1. A method of characterizing a turbine engine, the method comprising:

measuring, using an accelerometer monitoring the turbine engine during starting, data to detect energy detected by any contact during said starting between a rotor and a stator of the turbine engine;

measuring, using sensors, thermodynamic data on the turbine engine;

creating a database associating detection of contact with the measured thermodynamic data;

determining a thermal unbalance value based on the measured vibrations; and determining, based on a model and the database, a presence of a rotor thermal unbalance by associating the thermal unbalance value with the thermodynamic data, in order to avoid contacts between the rotor and the stator on starting.

2. A characterization method according to claim 1, further comprising inspecting the turbine engine when stopped to determine information about contact, if any, during said starting, which information is then associated with the thermodynamic data for the determining.

3. A characterization method according to claim 1, further comprising using simulated data concerning the behavior of the turbine engine for the determining.

4. A characterization method according to claim 1, performed on a particular given turbine engine.

5. A characterization method according to claim 1, performed for a fleet of turbine engines of the same model.

6. A characterization method according to claim 1, wherein the thermodynamic data comprises temperatures, pressures, or temperature gradients.

7. A characterization method according to claim 1, wherein detecting energy released by a contact, if any, comprises calculating a root mean square of the measurements of the accelerometer, or performing a Fourier transform on the measurements of the accelerometer.

8. An avionics device for a turbine engine for an aircraft, the device comprising:

a controller configured to receive data from accelerometers monitoring the turbine engine during starting and to detect therefrom the energy generated during said starting by contact between the rotor and the stator, if any, receive, from sensors, thermodynamic data on the turbine engine, and determine, based on a model and a database associating detection of contact with the measured thermodynamic data, a presence of a rotor thermal unbalance that needs to be taken into account for a starting process, wherein the controller is configured to determine the thermal unbalance of the rotor from the accelerometer data and to associate the thermal unbalance of the rotor with said information about contact, if any, for the determining of the presence of the rotor thermal unbalance.

9. An avionics device according to claim 8, wherein the controller is configured to recognize at least one condition for thermal unbalance being present on a rotor of the turbine engine after the engine has been stopped, for use in a possible restarting process.

10. An avionics device according to claim 9, wherein the controller informs the pilot and that controls the starting process.

11. An avionics device according to claim 9, wherein the controller is configured to estimate a time period during which the rotor thermal unbalance is present.

12. An avionics device according to claim 9, wherein the rotor thermal unbalance is estimated by using at least one measured temperature.

13. An avionics device according to claim 9, wherein the rotor thermal unbalance is estimated by using a measured pressure.

14. An avionics device according to claim 9, wherein the rotor thermal unbalance is estimated by using a statistical model.

15. An avionics device according to claim 9, wherein the statistical model comprises a regression tree or a neural network.

16. A characterization method according to claim 1, further comprising calculating a time interval during which starting is recommended.

* * * * *